US012025942B2

(12) United States Patent
Furukawa et al.

(10) Patent No.: US 12,025,942 B2
(45) Date of Patent: Jul. 2, 2024

(54) IMAGE FORMING APPARATUS

(71) Applicant: BROTHER KOGYO KABUSHIKI KAISHA, Nagoya (JP)

(72) Inventors: Masaaki Furukawa, Nagoya (JP); Sota Hirano, Kasugai (JP); Takahito Yamaji, Aisai (JP); Toshiyuki Sano, Iwakura (JP); Tadao Kyotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/817,380

(22) Filed: Aug. 4, 2022

(65) Prior Publication Data

US 2023/0043977 A1 Feb. 9, 2023

(30) Foreign Application Priority Data

Aug. 5, 2021 (JP) ................................ 2021-129212
Jun. 30, 2022 (JP) ................................ 2022-105648

(51) Int. Cl.
*G03G 15/00* (2006.01)

(52) U.S. Cl.
CPC .................................. *G03G 15/757* (2013.01)

(58) Field of Classification Search
CPC ............... G03G 15/757; G03G 15/607; G03G 2215/00721
See application file for complete search history.

(56) References Cited

U.S. PATENT DOCUMENTS 6,032,008 A * 2/2000 Kolodziej .......... G03G 15/5008 399/167
2003/0063928 A1* 4/2003 Matsuguma ........... G03G 15/01 399/299
2004/0005159 A1* 1/2004 Ito ...................... G03G 15/0266 399/50
2009/0279910 A1* 11/2009 Shiori ................ G03G 15/5004 399/50

(Continued)

FOREIGN PATENT DOCUMENTS

JP 2001-199610 A 7/2001
JP 2002-189322 A 7/2002

(Continued)

*Primary Examiner* — Sevan A Aydin
(74) *Attorney, Agent, or Firm* — Merchant & Gould P.C.

(57) ABSTRACT

An image forming apparatus is configured to perform image forming processing. The image forming apparatus includes a photosensitive drum, a main motor configured to generate a driving force, a drum clutch having a transmission state in which the driving force is transmitted to the photosensitive drum and a disconnected state in which the driving force is not transmitted to the photosensitive drum, a sheet sensor configured to detect a rear edge of a sheet upstream of the photosensitive drum in a sheet conveying direction, and a controller. In a case where a start command for subsequent image forming processing is not received after the sheet sensor detects a rear edge of a last sheet in image forming processing performed based on received print data, the controller executes drum clutch disconnection processing, and then executes main motor rotation stop processing.

10 Claims, 9 Drawing Sheets

(56) References Cited

U.S. PATENT DOCUMENTS

| | | | | |
|---|---|---|---|---|
| 2011/0249990 | A1* | 10/2011 | Izawa | G03G 15/104 399/238 |
| 2012/0141166 | A1* | 6/2012 | Kakehi | G03G 15/167 399/121 |
| 2014/0140726 | A1* | 5/2014 | Fukao | G03G 15/1615 399/302 |
| 2015/0277261 | A1 | 10/2015 | Suzuki | |
| 2016/0026110 | A1* | 1/2016 | Tsutsumi | G03G 21/06 399/128 |
| 2016/0313666 | A1* | 10/2016 | Kobayashi | G03G 15/0225 |
| 2016/0349664 | A1 | 12/2016 | Sawashima | |
| 2021/0356900 | A1 | 11/2021 | Nakamura et al. | |

FOREIGN PATENT DOCUMENTS

| | | | |
|---|---|---|---|
| JP | 2002-268503 | A | 9/2002 |
| JP | 2015-191210 | A | 11/2015 |
| JP | 2016-224418 | A | 12/2016 |

* cited by examiner

IMAGE FORMING APPARATUS

REFERENCE TO RELATED APPLICATIONS

This application claims priorities from Japanese Patent Application Nos. 2021-129212 filed on Aug. 5, 2021, and 2022-105648 filed on Jun. 30, 2022. The entire contents of the priority applications are incorporated herein by reference.

BACKGROUND ART

In the related art, in an image forming apparatus such as a laser printer, a toner image formed on a surface of a photosensitive drum is transferred to a sheet by a transfer roller, and then the toner image transferred to the sheet is fixed to the sheet by a fixing device.

Among such image forming apparatuses, there is one in which a plurality of members are driven by a motor. For example, there is an image forming apparatus in which three members, i. e., a photosensitive drum, a developing device, and a cleaning device, are driven by a single motor, and the driving of the members is switched by a clutch.

DESCRIPTION

Here, in order to maximize the throughput of print processing, that is, the number of pages of the sheet to be printed per unit time, it is preferable to continue the rotation of the photosensitive drum from when the printing on a preceding sheet is completed to when a subsequent sheet is conveyed to the photosensitive drum.

On the other hand, in order to reduce deterioration due to wear of the photosensitive drum, it is preferable to stop the rotation of the photosensitive drum when the preceding sheet passes through the nip between the photosensitive drum and the transfer roller, and to standby waiting for the subsequent sheet to be conveyed to the nip between the photosensitive drum and the transfer roller in a state where the rotation of the photosensitive drum is stopped.

However, if the rotation of the photosensitive drum is continued during a period from when the printing on the preceding sheet is completed to when the subsequent sheet is conveyed to the photosensitive drum, the photosensitive drum continues to rotate even during a period in which the printing is not performed, and thus the deterioration of the photosensitive drum progresses.

Further, if the rotation of the photosensitive drum is stopped during the period from when the printing on the preceding sheet is completed to when the subsequent sheet is conveyed to the photosensitive drum, it is necessary to restart the rotation of the photosensitive drum and wait until a rotation speed thereof becomes stable before the printing on the subsequent sheet is started, and thus the throughput of the print processing is reduced.

As described above, with the image forming apparatus disclosed in JP-A-2002-268503, it is not possible to achieve both the reduction of deterioration of the photosensitive drum and reduction in processing time of printing.

The process executed in an image forming apparatus in the present disclosure reduces deterioration of a photosensitive drum and processing time of printing.

In order to solve the above matters, according to an aspect of the present invention, there is provided an image forming apparatus that performs image forming processing of forming an image on a sheet, the image forming apparatus including: a photosensitive drum; a main motor; a drum clutch that switches between a transmission state in which a driving force of the main motor is transmitted to the photosensitive drum and a disconnected state in which the driving force of the main motor is not transmitted to the photosensitive drum; a sheet sensor that detects a rear edge of a sheet upstream of the photosensitive drum in a sheet conveying direction; and a controller.

In a case where a start command for subsequent image forming processing is not received after the sheet sensor detects a rear edge of a last sheet in image forming processing performed based on received print data, the controller executes drum clutch disconnection processing that is processing of switching the drum clutch to the disconnected state, and thereafter executes main motor rotation stop processing that is processing of stopping rotation of the main motor. In a case where a start command for subsequent image forming processing is received after the sheet sensor detects a rear edge of a last sheet in image forming processing performed based on received print data and before the drum clutch disconnection processing is executed, the controller executes the subsequent image forming processing without executing drum clutch connection processing that is processing of switching the drum clutch to a connected state. In a case where a start command for subsequent image forming processing is received after the drum clutch disconnection processing is executed and before the main motor rotation stop processing is executed, the controller executes the subsequent image forming processing after the drum clutch connection processing is executed.

According to the image forming apparatus having the above-described configuration, in a case where a start command for subsequent image forming processing is not received after the sheet sensor detects a rear edge of a last sheet in image forming processing performed based on received print data, the controller executes drum clutch disconnection processing, and thereafter executes main motor rotation stop processing. Accordingly, the rotation of the photosensitive drum may be stopped while a fixing device is driven, so that deterioration of the photosensitive drum due to wear may be reduced. In addition, in a case where a start command for subsequent image forming processing is received after a rear edge of the last sheet is detected and before the drum clutch disconnection processing is executed, the controller executes the subsequent image forming processing without executing drum clutch connection processing. Further, in a case where a start command for subsequent image forming processing is received after the drum clutch disconnection processing is executed and before the main motor rotation stop processing is executed, the controller executes the subsequent image forming processing after the drum clutch connection processing is executed. Accordingly, throughput of the image forming processing may be improved. In this way, deterioration of the photosensitive drum may be reduced and the throughput of the image forming processing may be improved.

The image forming apparatus according to an aspect of the present invention further includes a charger that charges the photosensitive drum. In a case where a start command for subsequent image forming processing is not received after the sheet sensor detects a rear edge of a last sheet in image forming processing performed based on received print data, the controller executes charging bias application stop processing of stopping application of a charging bias to the charger, and thereafter executes the drum clutch disconnection processing. In a case where a start command for subsequent image forming processing is received after the sheet sensor detects a rear edge of a last sheet in image forming processing performed based on received print data and before the charging bias application stop processing is executed, the controller executes the subsequent image forming processing without executing charging bias application start processing that is processing of starting application of a charging bias to the charger. In a case where a start command for subsequent image forming processing is received after the charging bias application stop processing is executed and before the drum clutch disconnection processing is executed, the controller executes the subsequent image forming processing after the charging bias application start processing is executed.

According to the image forming apparatus having the above-described configuration, in a case where a start command for subsequent image forming processing is received after a rear edge of the last sheet is detected and before the charging bias application stop processing is executed, the controller executes the subsequent image forming processing without executing charging bias application start processing. Accordingly, throughput of the image forming processing may be improved.

In the image forming apparatus according to an aspect of the present invention, the controller is configured to change of a charging bias applied to the charger between a first charging bias and a second charging bias having an absolute value smaller than an absolute value of the first charging bias. In a case where a start command for subsequent image forming processing is not received after the sheet sensor detects a rear edge of a last sheet in image forming processing performed based on received print data, the controller executes charging bias change processing of changing the charging bias applied to the charger from the first charging bias to the second charging bias, and thereafter executes the charging bias application stop processing. In a case where a start command for subsequent image forming processing is received after the sheet sensor detects a rear edge of a last sheet in image forming processing performed based on received print data and before the charging bias change processing is executed, the controller executes the subsequent image forming processing without executing charging bias reset processing that is processing of resetting the charging bias applied to the charger from the second charging bias to the first charging bias. In a case where a start command for subsequent image forming processing is received after the charging bias change processing is executed and before the charging bias application stop processing is executed, the controller executes the subsequent image forming processing after the charging bias reset processing is executed.

According to the image forming apparatus having the above-described configuration, in a case where a start command for subsequent image forming processing is received after a rear edge of the last sheet is detected and before the charging bias change processing is executed, the controller executes the subsequent image forming processing without executing charging bias reset processing. Accordingly, throughput of the image forming processing may be improved.

The image forming apparatus according to an aspect of the present invention further includes: a developing roller that supplies toner to a surface of the photosensitive drum to form a toner image; and a developing clutch that switches between a transmission state in which the driving force of the main motor is transmitted to the developing roller and a disconnected state in which the driving force of the main motor is not transmitted to the developing roller. In a case where a start command for subsequent image forming processing is not received after the sheet sensor detects a rear edge of a last sheet in image forming processing performed based on received print data, the controller executes developing clutch disconnection processing of switching the developing clutch to the disconnected state, and thereafter executes the drum clutch disconnection processing. In a case where a start command for subsequent image forming processing is received after the sheet sensor detects a rear edge of a last sheet in image forming processing performed based on received print data and before the developing clutch disconnection processing is executed, the controller executes the subsequent image forming processing without executing developing clutch connection processing of switching the developing clutch to a connected state. In a case where a start command for subsequent image forming processing is received after the developing clutch disconnection processing is executed and before the drum clutch disconnection processing is executed, the controller executes the subsequent image forming processing after the developing clutch connection processing is executed.

According to the image forming apparatus having the above-described configuration, in a case where a start command for subsequent image forming processing is received after a rear edge of the last sheet is detected and before the developing clutch disconnection processing is executed, the controller executes the subsequent image forming processing without executing developing clutch connection processing. Accordingly, throughput of the image forming processing may be improved.

In the image forming apparatus according to an aspect of the present invention, in a case where a start command for subsequent image forming processing is received before the main motor rotation stop processing is executed, the controller executes the subsequent image forming processing without executing the main motor rotation stop processing.

According to the image forming apparatus having the above-described configuration, in a case where a start command for subsequent image forming processing is received before the main motor rotation stop processing is executed, the controller executes the subsequent image forming processing without executing the main motor rotation stop processing. Thus, time of standing by until the main motor reaches a predetermined rotation speed by being restarted after being stopped from rotating may be saved, and throughput of predetermined image forming processing may be improved.

The image forming apparatus according to an aspect of the present invention further includes a transfer roller that transfers a toner image onto a sheet. In a case where a start command for subsequent image forming processing is not received after the sheet sensor detects a rear edge of a last sheet in image forming processing performed based on received print data, the controller executes transfer bias application stop processing of stopping application of a transfer bias to the transfer roller, and thereafter executes the drum clutch disconnection processing. In a case where a start command for subsequent image forming processing is received after the sheet sensor detects a rear edge of a last sheet in image forming processing performed based on received print data and before the transfer bias application stop processing is executed, the controller executes the subsequent image forming processing without executing transfer bias application start processing of starting application of a transfer bias to the transfer roller. In a case where a start command for subsequent image forming processing is received after the transfer bias application stop processing is executed and before the drum clutch disconnection processing is executed, the controller executes the subsequent image forming processing after the transfer bias application start processing is executed.

According to the image forming apparatus having the above-described configuration, in a case where a start command for subsequent image forming processing is received after a rear edge of the last sheet is detected and before the transfer bias application stop processing is executed, the controller executes the subsequent image forming processing without executing transfer bias application start processing. Thus, the throughput of the image forming processing may be improved.

In the image forming apparatus according to an aspect of the present invention, in a case where a start command for subsequent image forming processing is not received after the sheet sensor detects a rear edge of a last sheet in image forming processing performed based on received print data, the controller executes developing bias application stop processing of stopping application of a developing bias to the developing roller, and thereafter executes the developing clutch disconnection processing. In a case where a start command for subsequent image forming processing is received after the sheet sensor detects a rear edge of a last sheet in image forming processing performed based on received print data and before the developing bias application stop processing is executed, the controller executes the subsequent image forming processing without executing developing bias application start processing that is processing of starting application of a developing bias to the developing roller. In a case where a start command for subsequent image forming processing is received after the developing bias application stop processing is executed and before the developing clutch disconnection processing is executed, the controller executes the subsequent image forming processing after the developing bias application start processing is executed.

According to the image forming apparatus having the above-described configuration, in a case where a start command for subsequent image forming processing is received after a rear edge of the last sheet is detected and before the developing bias application stop processing is executed, the controller executes the subsequent image forming processing without executing developing bias application start processing. Thus, the throughput of the image forming processing may be improved.

In the image forming apparatus according to an aspect of the present invention, the controller is configured to change a state of a developing bias applied to the developing roller between a first developing bias and a second developing bias having an absolute value smaller than an absolute value of the first developing bias. In a case where a start command for subsequent image forming processing is not received after the sheet sensor detects a rear edge of a last sheet in image forming processing performed based on received print data, the controller executes developing bias change processing of changing the developing bias applied to the developing roller from the first developing bias to the second developing bias, and thereafter executes the developing bias application stop processing. In a case where a start command for subsequent image forming processing is received after the sheet sensor detects a rear edge of a last sheet in image forming processing performed based on received print data and before the developing bias change processing is executed, the controller executes the subsequent image forming processing without executing developing bias reset processing that is processing of resetting the developing bias applied to the developing roller from the second developing bias to the first developing bias. In a case where a start command for subsequent image forming processing is received after the developing bias change processing is executed and before the developing bias application stop processing is executed, the controller executes the subsequent image forming processing after the developing bias reset processing is executed.

According to the image forming apparatus having the above-described configuration, in a case where a start command for subsequent image forming processing is received after a rear edge of the last sheet is detected and before the developing bias change processing is executed, the controller executes the subsequent image forming processing without executing developing bias reset processing. Thus, the throughput of the image forming processing may be improved.

The image forming apparatus according to an aspect of the present invention further includes a temperature sensor that detects a temperature of a surrounding environment. As the temperature detected by the temperature sensor decreases, the controller increases standby time that is time of standing by until the drum clutch disconnection processing is executed after the sheet sensor detects a rear edge of a last sheet in image forming processing performed based on received print data.

According to the image forming apparatus having the above-described configuration, since wear of the photosensitive drum is less likely to progress in a low-temperature environment, the standby time of standing by until the drum clutch disconnection processing is executed after the rear edge of the last sheet is detected is lengthened as compared with that in a normal-temperature environment, so as to increase opportunities for a cleaning roller to collect foreign substances such as the toner adhering to the surface of the photosensitive drum.

According to an aspect of the present invention, the deterioration of the photosensitive drum and the processing time of printing may be reduced.

Hereinafter, an image forming apparatus 1 according to an embodiment of the present invention will be described with reference to FIGS. 1 to 9.

[Schematic Configuration of Image Forming Apparatus]

Figure 1:
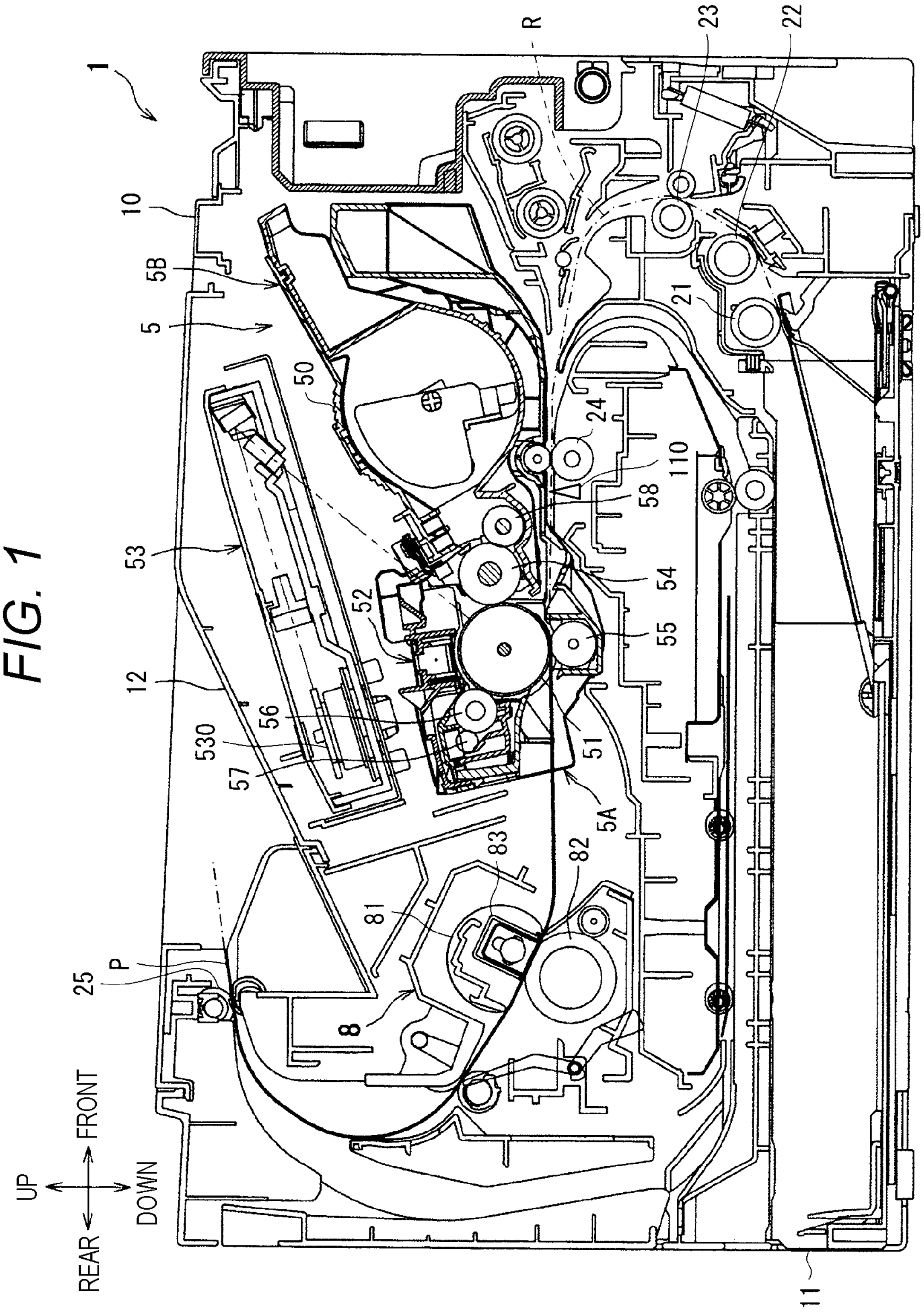
FIG. 1 is a schematic diagram illustrating an example of an internal configuration of an image forming apparatus according to an embodiment of the present invention.

FIG. 1 is a schematic diagram illustrating an example of an internal configuration of the image forming apparatus 1 according to an embodiment. As illustrated in FIG. 1, the image forming apparatus 1 is, for example, a monochrome laser printer, and includes a feed tray 11, a discharge tray 12, an image forming unit 5, and a fixing device 8 in a housing 10. For convenience of description, as indicated by arrows in FIG. 1, an up-down direction and a front-rear direction of the image forming apparatus 1 are defined.

The feed tray 11 is detachably attached to a lower portion of the housing 10 and supports the sheet P. The discharge tray 12 is provided at an upper portion of the housing 10, and supports the sheet P on which an image is formed by the image forming unit 5. The sheet P is, for example, plain paper.

The image forming apparatus 1 is provided with a conveyance path R for conveying the sheet P. The conveyance path R is a path from the feed tray 11 to the discharge tray 12 via the image forming unit 5 and the fixing device 8. Further, the image forming apparatus 1 includes a pickup roller 21, conveying rollers 22 and 23, a registration roller 24, and a discharge roller 25 as conveying units for conveying the sheet P along the conveyance path R.

The pickup roller 21 is provided at the feed tray 11, picks up the sheets P accommodated in the feed tray 11 one by one, and feeds the sheets P to the conveyance path R. The conveying rollers 22 and 23 convey the sheet P fed to the conveyance path R toward the registration roller 24.

The registration roller 24 is driven by a main motor 71 (see FIG. 2) aligns a direction of a leading edge of the sheet P, and then conveys the sheet P to the image forming unit 5. The discharge roller 25 is driven by a discharge motor (not shown), and discharges the sheet P, on which an image is formed by the image forming unit 5, to the discharge tray 12.

As illustrated in FIG. 1, the image forming unit 5 includes a photosensitive cartridge 5A and a developing cartridge 5B. The photosensitive cartridge 5A includes a photosensitive drum 51, a charger 52, a transfer roller 55, a cleaning roller 56, and a metal roller 57.

The photosensitive drum 51 is driven by a driving force from the main motor 71. The charger 52 is, for example, a scorotron charger, and is disposed facing the photosensitive drum 51. A charging bias is applied to the charger 52 by a charging bias applicator 61 (see FIG. 2). Thus, the charger 52 uniformly charges a surface of the photosensitive drum 51.

The transfer roller 55 is disposed facing the photosensitive drum 51. A predetermined forward transfer bias is applied to the transfer roller 55 by a transfer bias applicator 62. Accordingly, a toner image formed on the surface of the photosensitive drum 51 is electrically attracted to the transfer roller 55, and the toner image is transferred to the sheet P.

The cleaning roller 56 is, for example, a sponge roller. By applying a predetermined cleaning bias to the cleaning roller 56, toner, paper dust, and the like remaining on the surface of the photosensitive drum 51 are removed from the photosensitive drum 51.

The metal roller 57 is made of a metal such as stainless steel, and is disposed facing the cleaning roller 56. The metal roller 57 rotates while being in contact with the cleaning roller 56, and collects foreign substances such as toner and paper dust held by the cleaning roller 56. A positive collecting bias having a value larger than that of the cleaning bias is applied to the metal roller 57 from a cleaning bias applicator (not shown), so that the foreign substances held by the cleaning roller 56 is attracted to the metal roller 57 by an electrostatic force.

The developing cartridge 5B includes a laser scanner 53, a developing device 50, and a supply roller 58. The laser scanner 53 is provided at an upper portion in the housing 10, includes a polygon mirror 530, a laser emitting unit (not shown), a lens, a reflecting mirror, and the like, and irradiates the photosensitive drum 51 with laser light to expose the photosensitive drum 51 to form an electrostatic latent image based on image data on the surface of the photosensitive drum 51.

The developing device 50 accommodates toner therein. The developing device 50 includes a developing roller 54. The developing roller 54 is driven by the main motor 71 and supplies the toner to the electrostatic latent image formed on the surface of the photosensitive drum 51. Accordingly, a toner image is formed on the surface of the photosensitive drum 51. The image forming unit 5 forms an image based on image data on the sheet P by transferring the toner image formed on the surface of the photosensitive drum 51 to the sheet P by the transfer roller 55.

The fixing device 8 includes a heating unit 81, a roller 82, and a heater 83. In a case where the heating unit 81 and the roller 82 are pressed against each other, a fixing nip is formed between the heating unit 81 and the roller 82. The heater 83 includes, for example, a halogen heater, and heats the heating unit 81. The fixing device 8 fixes the toner image formed on the sheet P to the sheet P by conveying the sheet P on which the toner image is formed while heating the sheet P at the fixing nip.

[Electrical Configuration of Image Forming Apparatus]

Figure 2:
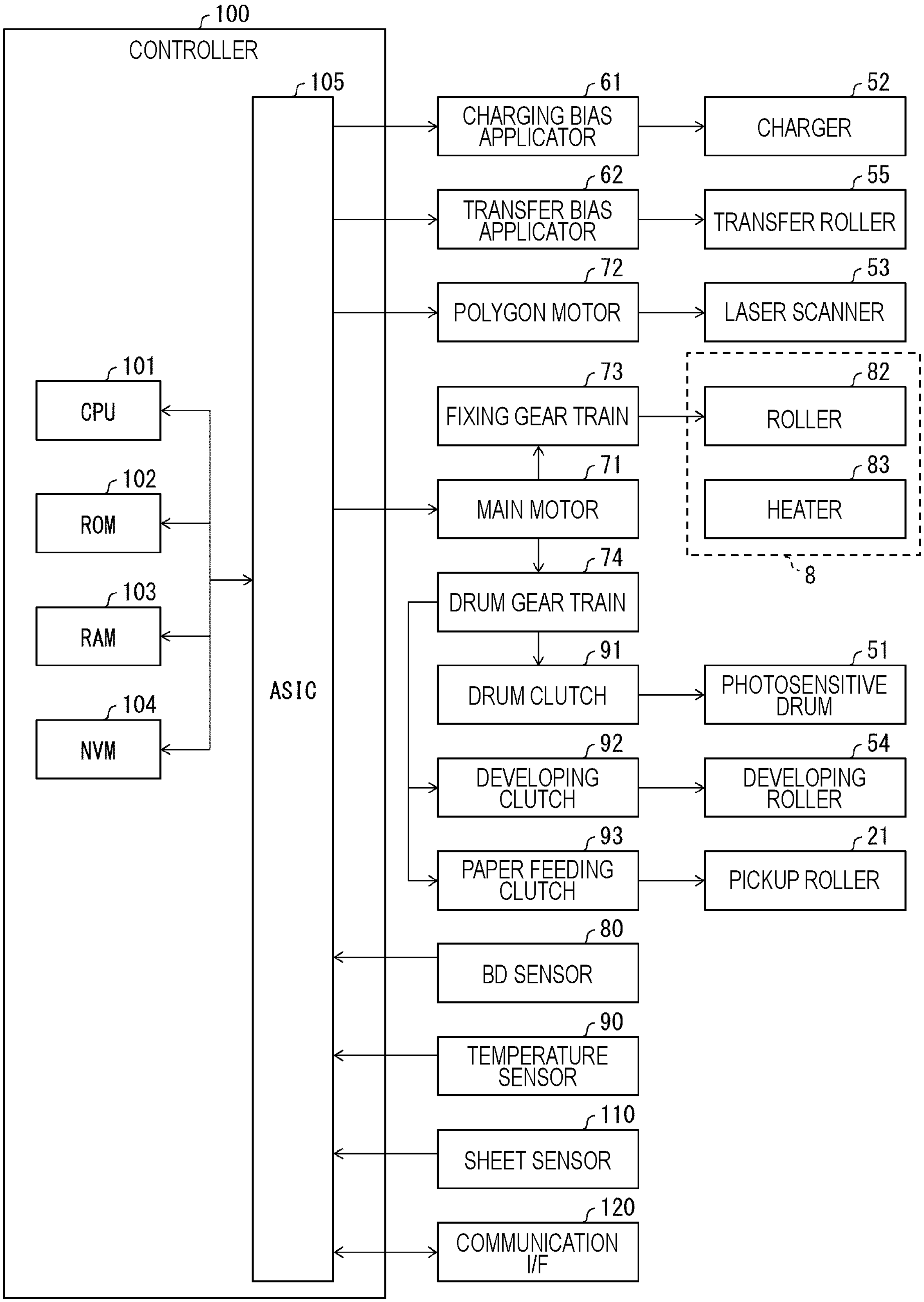
FIG. 2 is a block diagram illustrating an electrical configuration of the image forming apparatus according to the embodiment.

FIG. 2 is a block diagram illustrating an electrical configuration of the image forming apparatus 1 according to a first embodiment. As illustrated in FIG. 2, a controller 100 includes a central processing unit (CPU) 101, a read only memory (ROM) 102, a random access memory (RAM) 103, a non-volatile memory (NVM) 104, and an ASIC 105, which are connected by an internal bus.

The controller 100 performs overall control of each unit of the image forming apparatus 1. The ROM 102 stores various control programs for controlling the image forming apparatus 1, various settings, and the like. The RAM 103 is used as a work area in which the various control programs are read and a storage area in which image data is temporarily stored.

The NVM 104 stores in advance various types of data such as programs for controlling the charging bias applicator 61, the transfer bias applicator 62, and the like, setting values of respective biases, and a printing speed and an exposure speed to be described later.

The ASIC 105 is electrically connected to the charging bias applicator 61, the transfer bias applicator 62, the main motor 71, a polygon motor 72, a BD sensor 80, a temperature sensor 90, a sheet sensor 110, a communication interface (I/F) 120, and the like.

The charging bias applicator 61 applies a first charging bias and a second charging bias to the charger 52. An absolute value of the second charging bias is smaller than that of the first charging bias. The transfer bias applicator 62 applies a forward transfer bias and a reverse transfer bias to the transfer roller 55.

The controller 100 controls the driving of the laser scanner 53 by driving the polygon motor 72. Further, the controller 100 controls the driving of the fixing device 8, the photosensitive drum 51, the developing roller 54, the pickup roller 21, and the like by driving the main motor 71.

Specifically, a driving force of the main motor 71 is transmitted to the roller 82 via a fixing gear train 73. In addition, the driving force of the main motor 71 is transmitted to the photosensitive drum 51, the developing roller 54, and the pickup roller 21 via a drum gear train 74.

A drum clutch 91 switches between a transmission state in which the driving force of the main motor 71 is transmitted to the photosensitive drum 51 and a disconnected state in which the driving force of the main motor 71 is not transmitted to the photosensitive drum 51. A developing clutch 92 switches between a transmission state in which the driving force of the main motor 71 is transmitted to the developing roller 54 and a disconnected state in which the driving force of the main motor 71 is not transmitted to the developing roller 54.

A paper feeding clutch 93 switches between a transmission state in which the driving force of the main motor 71 is transmitted to the pickup roller 21 and a disconnected state in which the driving force of the main motor 71 is not transmitted to the pickup roller 21.

When the BD sensor 80 detects laser light emitted from the laser emitting unit, the BD sensor 80 outputs a BD signal to the controller 100. The BD sensor 80 is disposed at a position where the laser light reflected by a mirror surface of the polygon mirror 530 is incident when an angle of the mirror surface with respect to an emission direction of the laser light is a specific angle.

The temperature sensor 90 is disposed in the heating unit 81 and is used to estimate a temperature of the fixing nip. The temperature sensor 90 outputs a signal corresponding to the temperature of the fixing nip to the controller 100.

The sheet sensor 110 is a sensor that is disposed between the registration roller 24 and the photosensitive drum 51 in the conveyance path R and detects passage of the sheet P. As the sheet sensor 110, a sensor having an actuator that swings when the sheet P comes into contact with the actuator, an optical sensor, or the like may be used. The sheet sensor 110 outputs an ON signal in a state where the sheet P is passing, and outputs an OFF signal in a state where the sheet P is not passing. A detection signal from the sheet sensor 110 is output to the controller 100.

The communication I/F 120 is connected to a network such as a LAN, and enables connection to an external device in which a driver for the image forming apparatus 1 is incorporated. The image forming apparatus 1 may receive a start command for image forming processing via the communication I/F 120.

[Print Processing by Controller]

Figure 3:
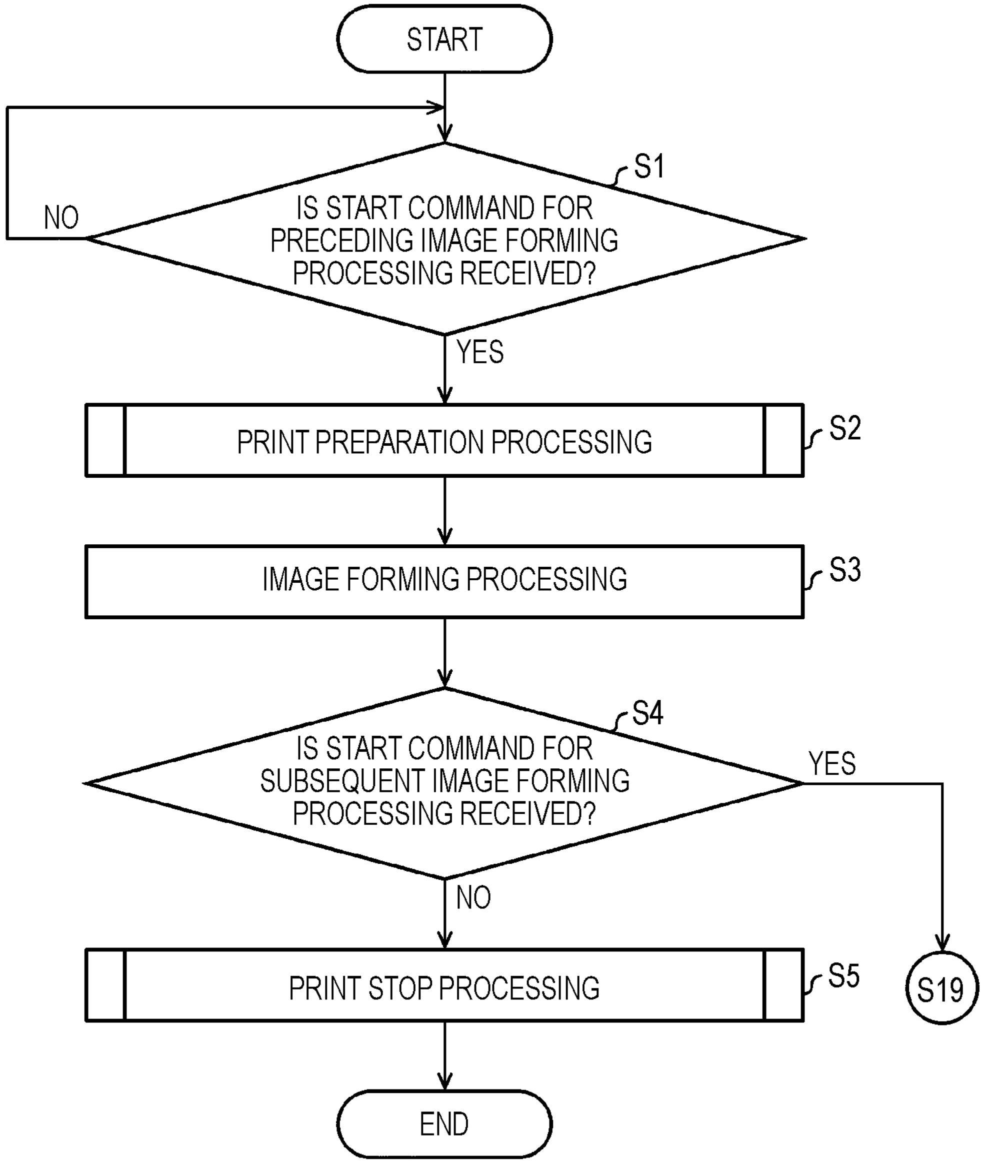
FIG. 3 is a flowchart illustrating an example of a flow of print processing of the image forming apparatus according to the embodiment.

Next, a flow of control of the print processing by the controller 100 will be described with reference to FIGS. 3 to 9. FIG. 3 is a flowchart illustrating an example of a flow of the print processing performed by the controller 100. In the example illustrated in FIG. 3, it is assumed that the image forming apparatus 1 continuously performs image forming processing for each of a plurality of sheets P.

In the flowchart shown in FIG. 3, first, the controller 100 determines whether a start command for preceding image forming processing among start commands for a plurality of times of image forming processing received via the communication I/F 120 is received (S1). In a case where the start command for preceding image forming processing is not received (S1: NO), the process returns to S1, and in a case where the start command for preceding image forming processing is received (S1: YES), the controller 100 executes print preparation processing S2.

After S2, when a leading edge of the sheet P passes the sheet sensor 110 and the sheet sensor 110 outputs an ON signal, the controller 100 causes the image forming unit 5 to start the image forming processing (S3). Specifically, during a period from t7 to t10 in FIG. 7, the controller 100 causes the photosensitive drum 51 and the transfer roller 55 to rotate. The controller 100 causes the photosensitive drum 51 and the transfer roller 55 to transfer a toner image on the surface of the photosensitive drum 51 to the sheet P by conveying the sheet P through a drum nip formed between the photosensitive drum 51 and the transfer roller 55.

Figure 7:
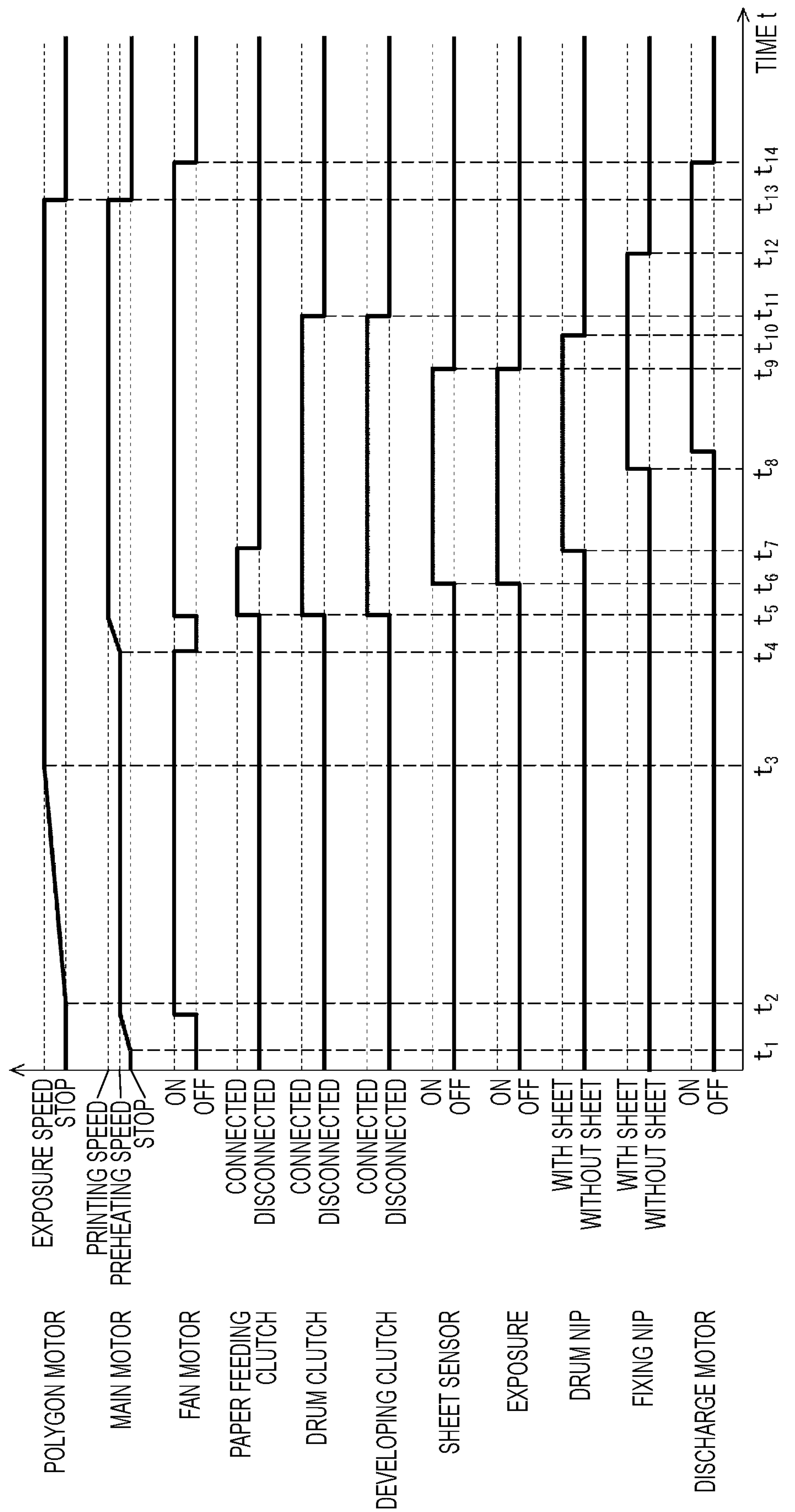
FIG. 7 is a timing chart relating to operations of units of the image forming apparatus according to the embodiment.

Then, during a period from t8 to t12 in FIG. 7, the controller 100 drives the fixing device 8 to convey the sheet P, on which the toner image is formed, while heating the sheet P at the fixing nip, thereby fixing the toner image formed on the sheet P to the sheet P. The sheet P, to which the toner image is thermally fixed, is discharged onto the discharge tray 12 by the discharge roller 25.

After S3, the controller 100 determines whether a start command for subsequent image forming processing is received (S4). In a case where the start command for subsequent image forming processing is received (S4: YES), the controller 100 executes standby processing S19 of the print preparation processing S2 illustrated in FIG. 4. On the other hand, in a case where the start command for subsequent image forming processing is not received (S4: NO), the controller 100 executes print stop processing (S5), and ends the flow of the print processing illustrated in FIG. 3.

<Print Preparation Processing>

Figure 4:
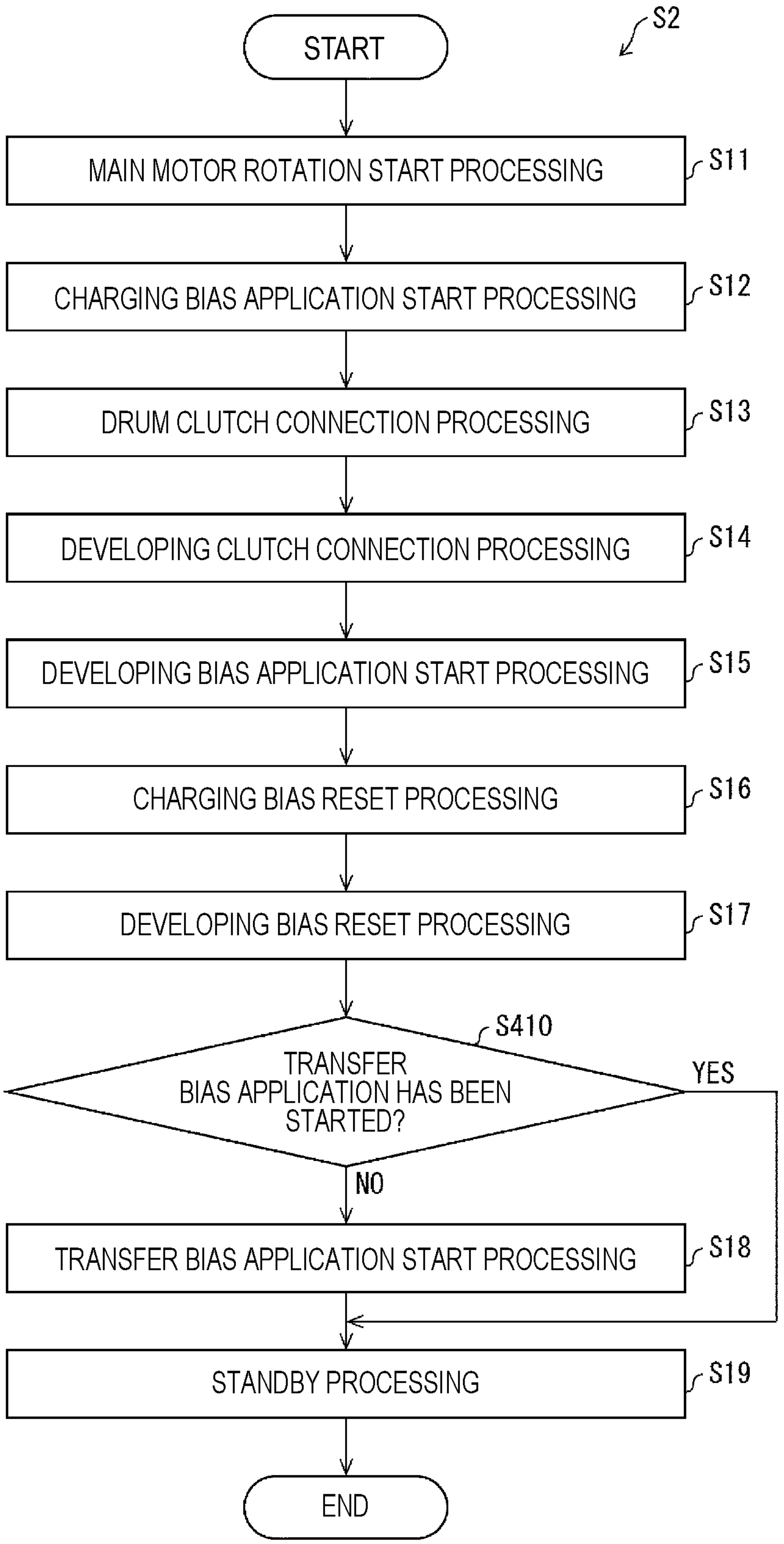
FIG. 4 is a flowchart illustrating an example of a flow of print preparation processing S2 of FIG. 3.
Figure 8:
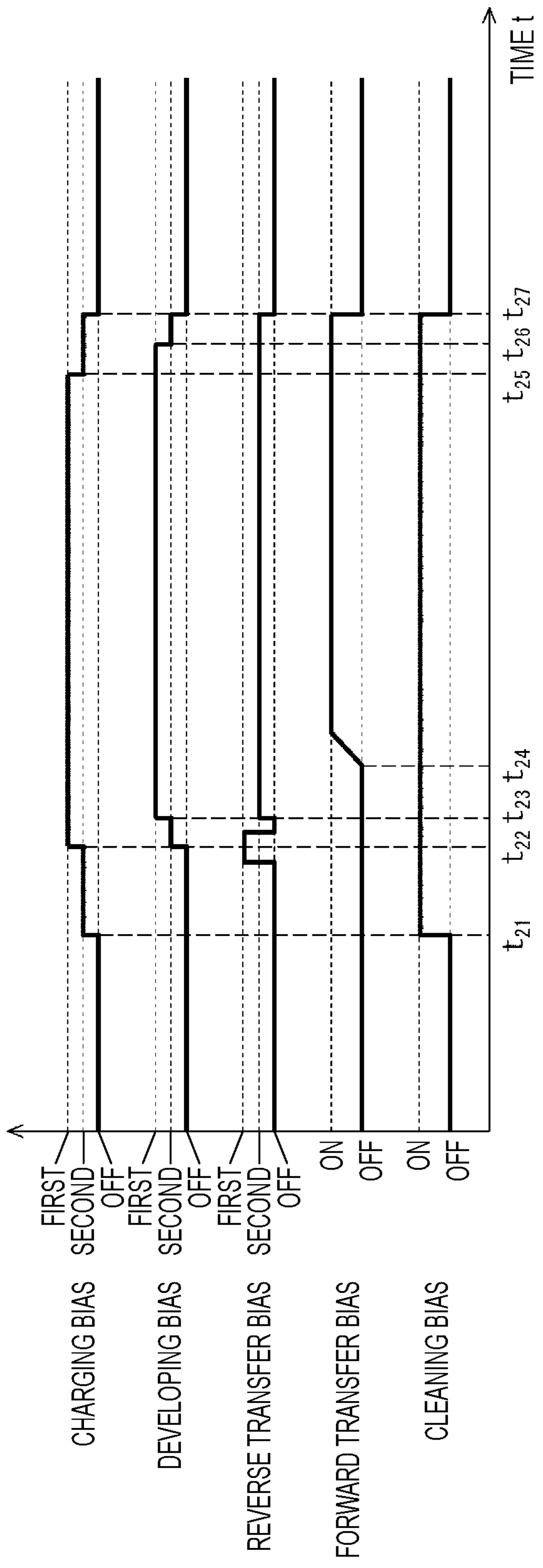
FIG. 8 is a timing chart illustrating a temporal change of each bias of the image forming apparatus according to the embodiment.

Next, a flow of the print preparation processing S2 will be described in detail with reference to FIGS. 4, 7, and 8. FIG. 4 is a flowchart illustrating an example of the flow of the print preparation processing S2 of FIG. 3. FIG. 7 is a timing chart relating to an operation of each unit of the image forming apparatus 1. FIG. 8 is a timing chart illustrating a temporal change in each bias of the image forming apparatus 1.

In the flowchart shown in FIG. 4, first, the controller 100 executes main motor rotation start processing for starting rotation of the main motor 71 (S11). Specifically, at t1 in FIG. 7, the controller 100 causes the roller 82 of the fixing device 8 to be rotated in a state where a rotation of the photosensitive drum 51 and a rotation of the developing roller 54 are stopped by rotating the main motor 71 at a preheating speed while the drum the drum clutch 91 and the developing clutch 92 are in the disconnected state. The preheating speed is a rotation speed for preheating the fixing device 8. With this control, a rotation of the photosensitive drum 51 and a rotation of the developing roller 54 are stopped during the preheating of the fixing device 8, and deterioration of the photosensitive drum 51 and the developing roller may be reduced.

The controller 100 starts the rotation of the polygon motor 72 at t2 in FIG. 7, and increases a rotation speed of the polygon motor 72 to an exposure speed at t3 in FIG. 7. The exposure speed is a rotation speed of the laser scanner 53 suitable for exposing the photosensitive drum 51. The exposure by the laser scanner 53 is performed during a period from t6 to t9 in FIG. 7.

Then, at t4 in FIG. 7, the controller 100 accelerates the rotation speed of the main motor 71 to a printing speed, which is a rotation speed higher than the preheating speed, while maintaining the drum clutch 91 in the disconnected state. The printing speed is a rotation speed of the main motor 71 suitable for performing the image forming processing on the sheet P.

Thereafter, the controller 100 causes the charging bias applicator 61 to execute charging bias application start processing of starting application of a charging bias to the charger 52 (S12). Specifically, the controller 100 applies the second charging bias to the charger 52 at t21 in FIG. 8.

Subsequently, at t5 in FIG. 7, the controller 100 executes drum clutch connection processing that is processing for switching the paper feeding clutch 93 to a connected state and switching the drum clutch 91 to a connected state (S13).

After S13, the controller 100 executes developing clutch connection processing that is processing of switching the developing clutch 92 to a connected state (S14).

Then, the controller 100 executes developing bias application start processing (S15). Specifically, at t22 in FIG. 8, the controller 100 causes a developing bias applicator (not shown) to apply a second developing bias to the developing roller 54.

After S15, the controller 100 executes charging bias reset processing that is processing of resetting the charging bias applied to the charger 52 from the second charging bias to the first charging bias (S16). Specifically, at t22 in FIG. 8, the controller 100 causes the charging bias applicator 61 to apply the first charging bias to the charger 52. The absolute value of the first charging bias is larger than the absolute value of the second charging bias.

Next, the controller 100 executes developing bias reset processing that is processing of resetting the developing bias applied to the developing roller 54 from the second developing bias to a first developing bias (S17). Specifically, at t23 in FIG. 8, the controller 100 causes the developing bias applicator to apply the first developing bias to the developing roller 54. An absolute value of the first developing bias is larger than an absolute value of the second developing bias.

After the step S17, the controller 100 determine whether an application of the transfer bias to the transfer roller 55 by the transfer bias applicator 62 has been started (S18). Specifically, the controller determines whether the transfer bias applicator 62 applies a forward transfer bias to the transfer roller 55. In a case where the transfer bias applicator 62 has started the application of the transfer bias to the transfer roller 55 (S410: YES), the process proceeds to a standby processing (S19) described later.

In a case where the controller determines the transfer bias applicator 62 has not yet started the application of the transfer bias to the transfer roller 55 (S410: NO), the controller 100 starts a transfer bias application start processing (S18) in which an application of the transfer bias to the transfer roller 55 by the transfer bias applicator 62 is started. Specifically, at t 24 of FIG. 8, the controller causes the transfer bias applicator 62 to apply the forward transfer bias to the transfer roller 55.

Then, the controller 100 executes the standby processing of standing by to wait for execution of the image forming processing S3 in FIG. 3 until the sheet sensor 110 outputs an ON signal at t6 in FIG. 7 when a leading edge of the sheet P passes through the sheet sensor 110 (S19). After the sheet sensor 110 outputs the ON signal, the controller 100 ends the standby processing (S19). That is, the flow of the print preparation processing S2 shown in FIG. 4 ends. After that, the process proceeds to the image forming processing S3 shown in FIG. 3.

<Print Stop Processing>

Figure 5:
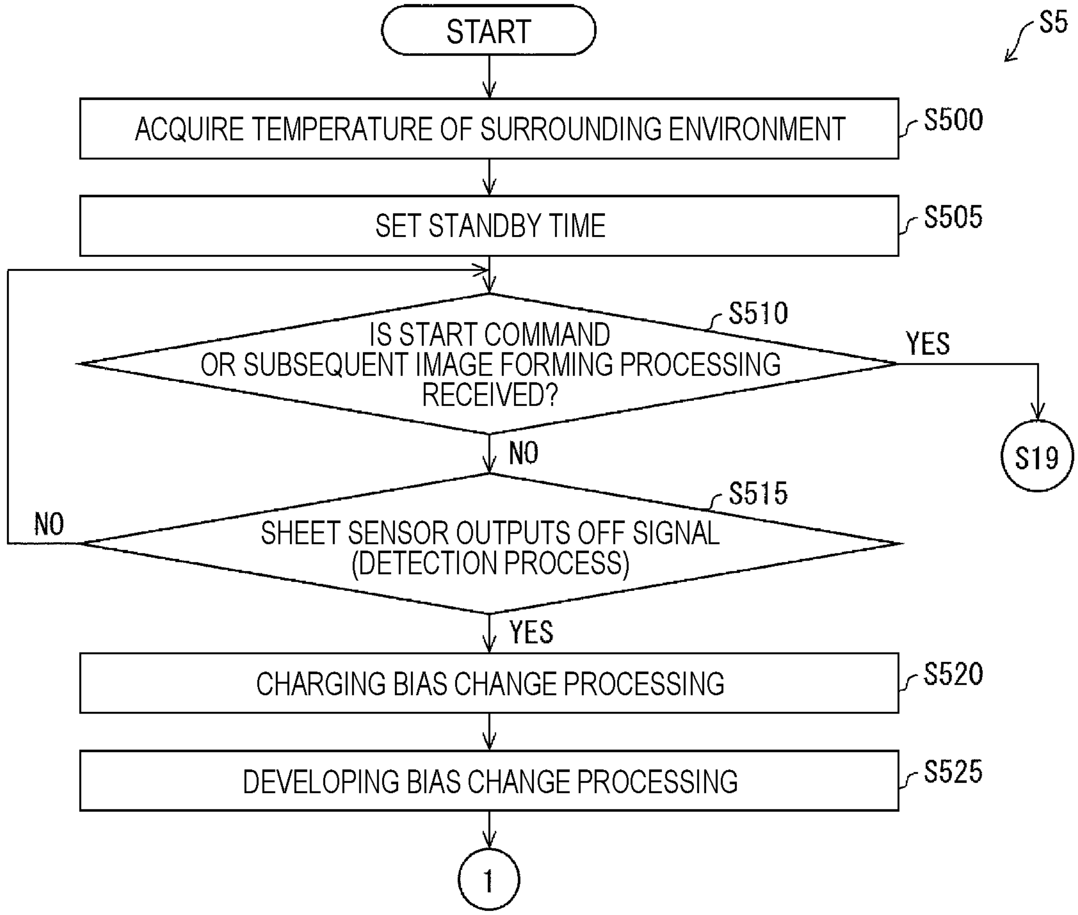
FIG. 5 is a flowchart illustrating an example of a flow of print stop processing S5 of FIG. 3.
Figure 6:
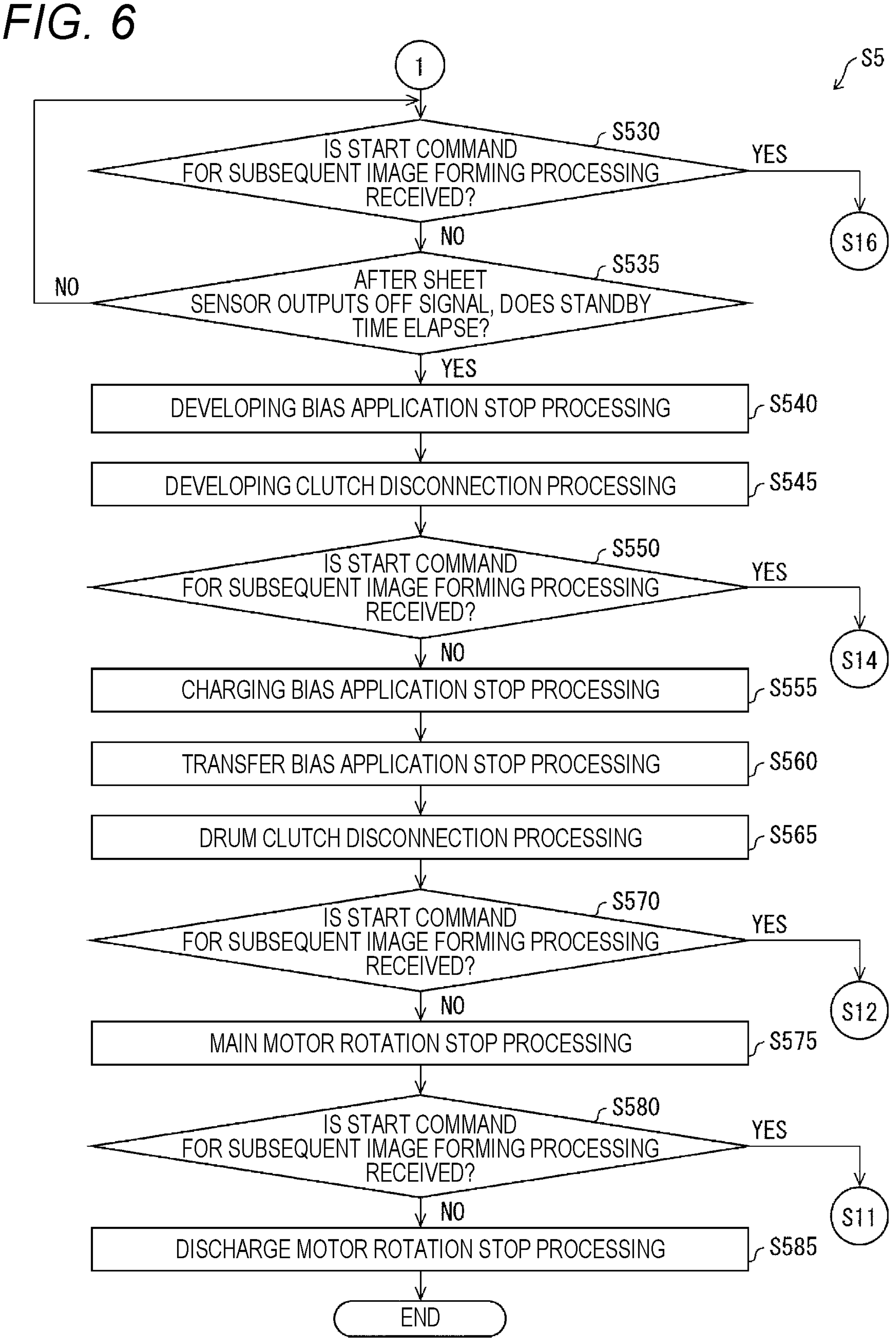
FIG. 6 is a flowchart continued from FIG. 5.

Next, the print stop processing S5 will be described in detail with reference to FIGS. 5 and 6. FIG. 5 is a flowchart illustrating an example of a flow of the print stop processing S5 of FIG. 3. FIG. 6 is a flowchart continued from FIG. 5.

In the print stop processing S5 illustrated in FIG. 5, first, the controller 100 acquires a temperature of a surrounding environment based on a detection result of the temperature sensor 90 (S500). Subsequently, the controller 100 sets standby time (S505).

The standby time is time of standing by from when the sheet sensor 110 detects a rear edge of the sheet P to when the controller 100 executes a series of processes from the developing bias application stop processing S540 to the drum clutch disconnection processing S565 of FIG. 6. A detail of the series of processes from the developing bias application stop processing S540 to the drum clutch disconnecting processing S565 will be described later After S505, the controller 100 determines whether a start command for subsequent image forming processing is received (S510). In a case where a start command for subsequent image forming processing is received (S510: YES), the controller 100 returns to the standby processing S19 in FIG. 4. That is, in a case where a start command for subsequent image forming processing is received before executing charging bias change processing (S520), the controller 100 executes the subsequent image forming processing without executing the charging bias reset processing (S16) in the print preparation processing S2. Accordingly, throughput of the print processing may be improved.

In a case where a start command for subsequent image forming processing is not received (S510: NO), the controller 100 determines whether the sheet sensor 110 outputs OFF signal (S515). That is, the controller 100 executes detection processing of detecting that the sheet sensor 110 outputs OFF signal when the rear edge of the preceding sheet P passes through the sheet sensor 110 (S515). In the present embodiment, the controller 100 detects the rear edge of the sheet P passing through the sheet sensor 110 by detecting ON signal and OFF signal from the sheet sensor 110.

In a case where the sheet sensor 110 does not output OFF signal (S515: NO), the controller 100 executes the process S510 again. That is, the controller waits for the rear edge of the sheet P to pass through the sheet sensor 110.

In a case where sheet sensor 110 outputs OFF signal (S515: YES), the controller 100 performs the charging bias change processing (S520). Specifically, at t25 in FIG. 8, the controller 100 changes the charging bias to be applied to the charger 52 from the first charging bias to the second charging bias.

After S520, the controller 100 executes developing bias change processing (S525). Specifically, the controller 100 changes the developing bias applied to the developing roller 54 from the first developing bias to the second developing bias at t26 in FIG. 8.

Next, moving to FIG. 6, the controller 100 determines again whether a start command for subsequent image forming processing is received (S530). In a case where a start command for subsequent image forming processing is received (S530: YES), the controller 100 returns to S16 of FIG. 4. That is, in a case where a start command for subsequent image forming processing is received (S530: YES) before executing developing bias application stop processing (S540), the process moves to S16 of FIG. 4. Then, the controller 100 executes the next image forming processing S3 after execution of processes after S16 without executing the developing bias application start processing (S15). Accordingly, the throughput of the print processing may be improved.

In a case where a start command for subsequent image forming processing is not received (S530: NO), the controller 100 determines whether the standby time set by S505 elapses from a time when the sheet sensor 110 outputs OFF signal (S535). In a case where the standby time has not yet elapsed (S535: NO), the controller executes the process of S530 again. That is, the controller waits for reaching the standby time set by S505.

After the sheet sensor 110 output OFF signal, in a case where the standby time elapse (S535: YES), the controller starts executing a series of processes from the developing bias application stop processing S540 to the drum clutch disconnecting processing (S565).

The controller 100 rotates the photosensitive drum 51 in a state where a second charging bias is applied to the charger 52 and a second developing bias is applied to the developing roller 54 after the sheet sensor output OFF signal. With this control, remaining tonner on the photosensitive drum is collected by the cleaning roller.

The photosensitive drum 51 of this embodiment wears when rotated. The photosensitive drum 51 is more likely to wear in a high temperature environment than in a normal temperature environment, and is less likely to wear in a low temperature environment than in a normal temperature environment. Therefore, in a low temperature environment, the waiting time is set into longer than in a normal temperature environment in order to increase the chance that toner or foreign matter such as paper dust adhering to the surface of the photosensitive drum 51 is collected by the cleaning roller 56. Further, the wear of the photosensitive drum 51 is reduced by shortening the standby time in a high temperature environment as compared with the normal temperature environment.

Figure 9:
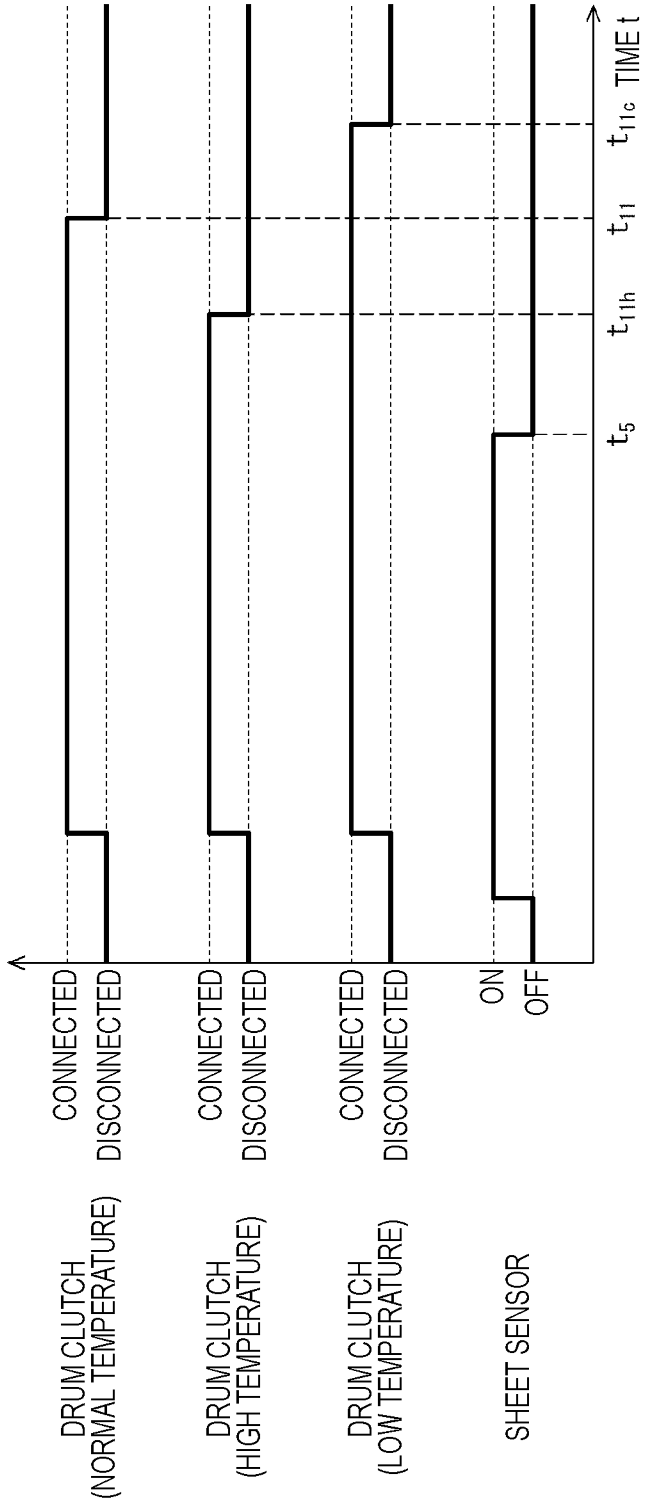
FIG. 9 is a graph illustrating a difference in driving time of a photosensitive drum according to a temperature of a surrounding environment.

Here, a setting of the standby time in S505 will be explained with reference to FIG. 9. FIG. 9 is a graph illustrating a difference in driving time of a photosensitive drum according to a temperature of a surrounding environment.

In FIG. 9, the rear edge of the sheet P is detected at t9 by the sheet sensor 110. In the normal temperature environment, the controller 100 maintains the drum clutch in the connected state until t11 and the photosensitive drum 51 may be driven by then.

In the high temperature environment, the controller 100 maintain the drum clutch in the connected state until $t\mathbf{11}_h$ and the photosensitive drum 51 may be driven by them. A term from t9 to $t\mathbf{11}_h$ is shorter than a term from t9 to t11. That is, in S505, in a case where the temperament environment is the high temperature environment, the standby time is set so that a term from detection of the rear edge of the sheet P by the sheet sensor 110 to disconnection of the drum clutch in the high temperature environment is shorter than that in the normal temperature environment.

In the low temperature environment, the controller 100 maintain the drum clutch in the connected state until $t\mathbf{11}_c$ and the photosensitive drum 51 may be driven by them. A term from t9 to $t\mathbf{11}_c$ is longer than a term from t9 to t11. That is, in S505, in a case where the temperament environment is the low temperature environment, the standby time is set so that a term from detection of the rear edge of the sheet P by the sheet sensor 110 to disconnection of the drum clutch in the low temperature environment is longer than that in the normal temperature environment.

Accordingly, a term from the detection of the rear edge of the sheet P by the sheet sensor 100 to the disconnection of the drum clutch by the controller is a sum of the standby time and a process time of a series of a process from S540 to S565.

In S540, the controller 100 executes a developing bias application stop processing (S540). After S540, the controller 100 executes a developing clutch disconnection processing (S545) in which the developing clutch 92 is switched to the disconnected state (S545).

After S545, the controller 100 determines whether a start command for subsequent image forming processing is received (S550). In a case where a start command for subsequent image forming processing is received (S550: YES), the controller 100 returns to S14 of FIG. 4. That is, in a case where a start command for subsequent image forming processing is received after the transfer bias application stop processing (S540) is executed and before the drum clutch disconnection processing (S565) is executed (S550: YES), the process returns to S14 in FIG. 4. That is, the controller 100 executes the next image forming processing after executing the developing clutch connection processing (S14) and processes after S14 without executing the drum clutch connection processing (S13). Accordingly, the throughput of the print processing may be improved.

In a case where the controller does not receive a start command for subsequent image forming processing (S550: NO), the controller 100 executes a charging bias application stop processing (S555). Specifically, the controller 100 stops applying the charging bias to the charger 52 by the charging bias applicator 61 at t27 in FIG. 8.

After S555, the controller 100 executes a transfer bias application stop processing (S560). Specifically, at t27 in FIG. 7, the controller stops applying the transfer bias to the transfer roller 55. After S560, the controller executes a drum clutch disconnection processing (S565). Specifically, the controller switches the drum clutch 91 to the disconnected state, and stops the driving of the photosensitive drum 51.

After S565, the controller 100 determines whether a start command for subsequent image forming processing is received (S570). In a case where a start command for subsequent image forming processing is received (S570: YES), the controller 100 returns to S12 of FIG. 4. That is, in a case where a start command for subsequent image forming processing is received after the drum clutch disconnection processing (S565) is executed and before main motor rotation stop processing of stopping the rotation of the main motor 71 (S575) is executed, the process returns to S12 of FIG. 4. That is, the controller 100 executes S12 and the processes after S12 without executing the main motor rotation stop processing (S575) and then executes the next image forming processing.

Therefore, after the image forming processing on the preceding sheet P is completed, the image forming processing on the subsequent sheet P may be started without stopping the rotation of the main motor 71. Thus, time of standing by until the main motor 71 rotates at the printing speed by being restarted after being stopped from rotating may be saved. Accordingly, the throughput of the print processing may be improved.

In a case where a start command for subsequent image forming processing is not received (S570: NO), the controller 100 executes the main motor rotation stop processing that is processing of stopping the rotation of the main motor 71 (S575).

After S575, the controller 100 determines whether a start command for subsequent image forming processing is received (S580). In a case where a start command for subsequent image forming processing is received (S580: YES), the controller 100 returns to S11 of FIG. 4. That is, in a case where a start command for subsequent image forming processing is received after the main motor rotation stop processing (S575) is executed, the controller 100 executes the main motor rotation start processing (S11) and then executes the next image forming processing (S3).

On the other hand, in a case where a start command for subsequent image forming processing is not received (S580: NO), the controller 100 executes discharge motor rotation stop processing (S585). Specifically, in S585, the controller 100 stops rotation of a discharge motor and rotation of a fan motor (not shown) at t14 in FIG. 7. As explained above, the flow of image forming (S5) shown in FIGS. 5 and 6 ends.

As described above, in the image forming apparatus 1 according to the present embodiment, when continuously performing a plurality of times of image forming processing on a plurality of sheets P, the flow of the processing executed by the controller 100 is changed in accordance with a timing at which a start command for subsequent image forming processing is received after a start command for preceding image forming processing is received. Accordingly, deterioration of the photosensitive drum 51 and processing time of printing may be reduced.

OTHER EMBODIMENTS

Although the image forming apparatus 1 according to the above-described embodiment is a monochrome laser printer, the image forming apparatus 1 is not limited thereto, and may be a multi-function peripheral (MFP) having a printer function, a scanner function, and the like.

Although the sheet P is plain paper in the above-described embodiment, the type of the sheet P is not limited thereto, and may be thick paper or thin paper, for example. Further, a value of each bias shown in FIG. 8 may vary depending on the type of the sheet P.

In addition, the processing executed by the controller 100 illustrated in FIGS. 4 to 6 is an example, and contents of a part of the processing may be changed or an order of a part of the processing may be changed.

[Example of Implementation by Software]

The controller 100 of the image forming apparatus 1 may be implemented with a logic circuit (hardware) formed in an integrated circuit (IC chip) or the like, or may be implemented by software.

In the latter case, the image forming apparatus 1 includes a computer that executes a command of a program that is software for implementing functions. The computer includes, for example, one or more processors and a computer-readable recording medium storing the program. In the computer, the processor reads the program from the recording medium and executes the program, thereby achieving the object of the present invention. As the processor, for example, a central processing unit (CPU) may be used. Examples of the recording medium include "a non-transitory tangible medium" such as a read only memory (ROM), a tape, a disk, a card, a semiconductor memory, and a programmable logic circuit. In addition, a random access memory (RAM) or the like in which the program is loaded may be further provided. The program may be supplied to the computer via any transmission medium (such as a communication network or a broadcast wave) capable of transmitting the program. An aspect of the present invention may also be implemented in a form of a data signal in which the program is embodied by electronic transmission and which is embedded in a carrier wave.

The present invention is not limited to the above-described embodiments, and various modifications may be made within the scope of the claims. Embodiments obtained by appropriately combining the technical means disclosed in the different embodiments also fall within the technical scope of the present invention.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

What is claimed is:

1. An image forming apparatus that is configured to perform image forming processing, the image forming apparatus comprising:

a photosensitive drum;

a main motor configured to generate a driving force;

a drum clutch having a transmission state in which the driving force is transmitted to the photosensitive drum and a disconnected state in which the driving force is not transmitted to the photosensitive drum;

a sheet sensor configured to detect a rear edge of a sheet upstream of the photosensitive drum in a sheet conveying direction;

a charger configured to charge the photosensitive drum; and a controller, wherein in a case where a start command for subsequent image forming processing is not received after the sheet sensor detects a rear edge of a last sheet in image forming processing performed based on received print data, the controller executes charging bias application stop processing of stopping application of a charging bias to the charger, and then executes drum clutch disconnection processing in which a state of the drum clutch is changed to the disconnected state, and then executes main motor rotation stop processing in which rotation of the main motor is stopped, wherein in a case where a start command for subsequent image forming processing is received after the sheet sensor detects a rear edge of a last sheet in image forming processing performed based on received print data and before the drum clutch disconnection processing is executed, the controller executes the subsequent image forming processing without executing drum clutch connection processing in which a state of the drum clutch is changed to a connected state, wherein in a case where a start command for subsequent image forming processing is received after the drum clutch disconnection processing is executed and before the main motor rotation stop processing is executed, the controller executes the subsequent image forming processing after the drum clutch connection processing is executed, wherein the controller is configured to change a state of a charging bias applied to the charger between a first charging bias and a second charging bias having an absolute value smaller than an absolute value of the first charging bias, and wherein in a case where a start command for subsequent image forming processing is not received after the sheet sensor detects a rear edge of a last sheet in image forming processing performed based on received print data, the controller executes charging bias change processing of changing the charging bias applied to the charger from the first charging bias to the second charging bias, and then executes the charging bias application stop processing.

2. The image forming apparatus according to claim 1, further comprising:

a charger configured to charge the photosensitive drum, wherein in a state where a start command for subsequent image forming processing is not received after the sheet sensor detects a rear edge of a last sheet in image forming processing performed based on received print data, the controller executes charging bias application stop processing of stopping application of a charging bias to the charger, and then executes the drum clutch disconnection processing, wherein in a case where a start command for subsequent image forming processing is received after the sheet sensor detects a rear edge of a last sheet in image forming processing performed based on received print data and before the charging bias application stop processing is executed, the controller executes the subsequent image forming processing without executing charging bias application start processing that is processing of starting application of the charging bias to the charger, and wherein in a case where a start command for subsequent image forming processing is received after the charging bias application stop processing is executed and before the drum clutch disconnection processing is executed, the controller executes the subsequent image forming processing after the charging bias application start processing is executed.

3. The image forming apparatus according to claim 2, wherein the controller is configured to change a state of a charging bias applied to the charger between a first charging bias and a second charging bias having an absolute value smaller than an absolute value of the first charging bias, wherein in a case where a start command for subsequent image forming processing is not received after the sheet sensor detects a rear edge of a last sheet in image forming processing performed based on received print data, the controller executes charging bias change processing of changing the charging bias applied to the charger from the first charging bias to the second charging bias, and then executes the charging bias application stop processing, wherein in case where a start command for subsequent image forming processing is received after the sheet sensor detects a rear edge of a last sheet in image forming processing performed based on received print data and before the charging bias change processing is executed, the controller executes the subsequent image forming processing without executing charging bias reset processing that is processing of resetting the charging bias applied to the charger from the second charging bias to the first charging bias, and wherein in a case where a start command for subsequent image forming processing is received after the charging bias change processing is executed and before the charging bias application stop processing is executed, the controller executes the subsequent image forming processing after the charging bias reset processing is executed.

4. The image forming apparatus according to claim 1, further comprising:

a developing roller configured to supply toner to a surface of the photosensitive drum to form a toner image; and a developing clutch having a transmission state in which the driving force of the main motor is transmitted to the developing roller and a disconnected state in which the driving force of the main motor is not transmitted to the developing roller, wherein in a case where a start command for subsequent image forming processing is not received after the sheet sensor detects a rear edge of a last sheet in image forming processing performed based on received print data, the controller executes developing clutch disconnection processing in which a state of the developing clutch is changed to the disconnected state, and then executes the drum clutch disconnection processing, wherein in a case where a start command for subsequent image forming processing is received after the sheet sensor detects a rear edge of a last sheet in image forming processing performed based on received print data and before the developing clutch disconnection processing is executed, the controller executes the subsequent image forming processing without executing developing clutch connection processing in which a state of the developing clutch is changed to a connected state, and wherein in a state where a start command for subsequent image forming processing is received after the developing clutch disconnection processing is executed and before the drum clutch disconnection processing is executed, the controller executes the subsequent image forming processing after the developing clutch connection processing is executed.

5. The image forming apparatus according to claim 4, wherein in a case where a start command for subsequent image forming processing is not received after the sheet sensor detects a rear edge of a last sheet in image forming processing performed based on received print data, the controller executes developing bias application stop processing in which application of a developing bias to the developing roller is stopped, and then executes the developing clutch disconnection processing, wherein in a case where a start command for subsequent image forming processing is received after the sheet sensor detects a rear edge of a last sheet in image forming processing performed based on received print data and before the developing bias application stop processing is executed, the controller executes the subsequent image forming processing without executing developing bias application start processing in which application of a developing bias to the developing roller is started, and wherein in a case where a start command for subsequent image forming processing is received after the developing bias application stop processing is executed and before the developing clutch disconnection processing is executed, the controller executes the subsequent image forming processing after the developing bias application start processing is executed.

6. The image forming apparatus according to claim 1, wherein in a case where a start command for subsequent image forming processing is received before the main motor rotation stop processing is executed, the controller executes the subsequent image forming processing without executing the main motor rotation stop processing.

7. The image forming apparatus according to claim 1, further comprising:

a transfer roller configured to transfer a toner image onto a sheet, wherein in a case where a start command for subsequent image forming processing is not received after the sheet sensor detects a rear edge of a last sheet in image forming processing performed based on received print data, the controller executes transfer bias application stop processing in which a transfer bias applied to the transfer roller is stopped, and then executes the drum clutch disconnection processing, wherein in a case where a start command for subsequent image forming processing is received after the sheet sensor detects a rear edge of a last sheet in image forming processing performed based on received print data and before the transfer bias application stop processing is executed, the controller executes the subsequent image forming processing without executing transfer bias application start processing in which an application of a transfer bias to the transfer roller is started, and wherein in a case where a start command for subsequent image forming processing is received after the transfer bias application stop processing is executed and before the drum clutch disconnection processing is executed, the controller executes the subsequent image forming processing after the transfer bias application start processing is executed.

8. The image forming apparatus according to claim 1, further comprising:

a temperature sensor configured to detect a temperature of a surrounding environment of the image forming apparatus, wherein as the temperature detected by the temperature sensor decreases, the controller increases standby time that is time of standing by until the drum clutch disconnection processing is executed after the sheet sensor detects a rear edge of a last sheet in image forming processing performed based on received print data.

9. An image forming apparatus that is configured to perform image forming processing, the image forming apparatus comprising:

a photosensitive drum;

a main motor configured to generate a driving force;

a drum clutch having an engaging state in which a transmission of the driving force to the photosensitive drum is engaged and a disengaging state in which a transmission of the driving force to the photosensitive drum is disengaged;

a sheet sensor configured to detect a rear edge of a sheet upstream of the photosensitive drum in a sheet conveying direction;

a temperature sensor configured to detect a temperature of a surrounding environment of the image forming apparatus; and a controller, wherein in a case where a start command for subsequent image forming processing is not received after the sheet sensor detects a rear edge of a last sheet in image forming processing performed based on received print data, the controller executes drum clutch disconnection processing in which a state of the drum clutch is changed to the disengaging state, and then executes main motor rotation stop processing in which rotation of the main motor is stopped, wherein in a case where a start command for subsequent image forming processing is received after the sheet sensor detects a rear edge of a last sheet in image forming processing performed based on received print data and before the drum clutch disconnection processing is executed, the controller executes the subsequent image forming processing without executing drum clutch connection processing in which a state of the drum clutch is changed to an engaging state, wherein in a case where a start command for subsequent image forming processing is received after the drum clutch disconnection processing is executed and before the main motor rotation stop processing is executed, the controller executes the subsequent image forming processing after the drum clutch connection processing is executed, and wherein as the temperature detected by the temperature sensor decreases, the controller increases standby time that is time of standing by until the drum clutch disconnection processing is executed after the sheet sensor detects a rear edge of a last sheet in image forming processing performed based on received print data.

10. An image forming apparatus that is configured to perform image forming processing, the image forming apparatus comprising:

a photosensitive drum;

a main motor configured to generate a driving force;

a drum clutch having a transmission state in which the driving force is transmitted to the photosensitive drum and a disconnected state in which the driving force is not transmitted to the photosensitive drum;

a sheet sensor configured to detect a rear edge of a sheet upstream of the photosensitive drum in a sheet conveying direction;

a developing roller configured to supply toner to a surface of the photosensitive drum to form a toner image;

a developing clutch having a transmission state in which the driving force of the main motor is transmitted to the developing roller and a disconnected state in which the driving force of the main motor is not transmitted to the developing roller; and a controller, wherein in a case where a start command for subsequent image forming processing is not received after the sheet sensor detects a rear edge of a last sheet in image forming processing performed based on received print data, the controller executes:

developing clutch disconnection processing in which a state of the developing clutch is changed to the disconnected state, and after executing the developing clutch disconnection processing, drum clutch disconnection processing in which a state of the drum clutch is changed to the disconnected state, and then executes main motor rotation stop processing in which rotation of the main motor is stopped, wherein in a case where a start command for subsequent image forming processing is received after the sheet sensor detects a rear edge of a last sheet in image forming processing performed based on received print data and before the drum clutch disconnection processing is executed, the controller executes the subsequent image forming processing without executing drum clutch connection processing in which a state of the drum clutch is changed to a connected state, wherein in a case where a start command for subsequent image forming processing is received after the sheet sensor detects a rear edge of a last sheet in image forming processing performed based on received print data and before the developing clutch disconnection processing is executed, the controller executes the subsequent image forming processing without executing developing clutch connection processing in which a state of the developing clutch is changed to a connected state, wherein in a case where a start command for subsequent image forming processing is received after the drum clutch disconnection processing is executed and before the main motor rotation stop processing is executed, the controller executes the subsequent image forming processing after the drum clutch connection processing is executed, and wherein in a state where a start command for subsequent image forming processing is received after the developing clutch disconnection processing is executed and before the drum clutch disconnection processing is executed, the controller executes the subsequent image forming processing after the developing clutch connection processing is executed.

* * * * *